July 11, 1939. L. U. EYERLY 2,165,698
SEAT FOR AMUSEMENT DEVICES
Filed July 23, 1937 2 Sheets-Sheet 1
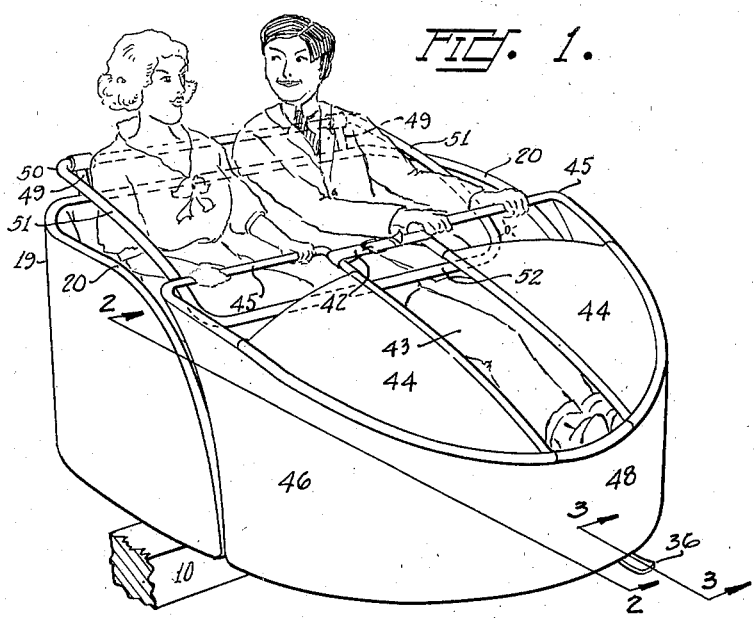
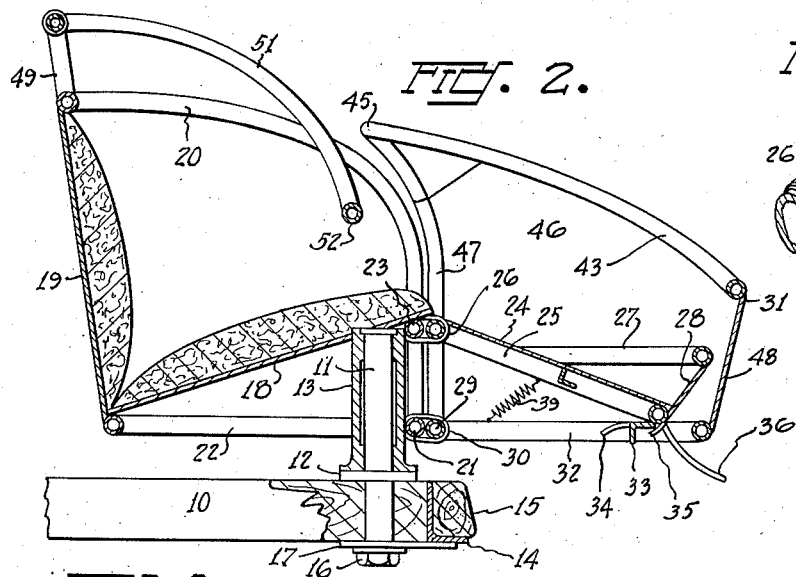
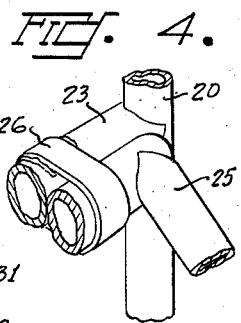
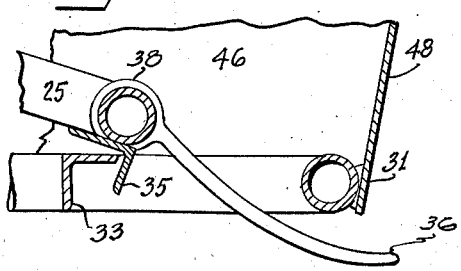
INVENTOR.
L. U. EYERLY
BY
ATTORNEY.

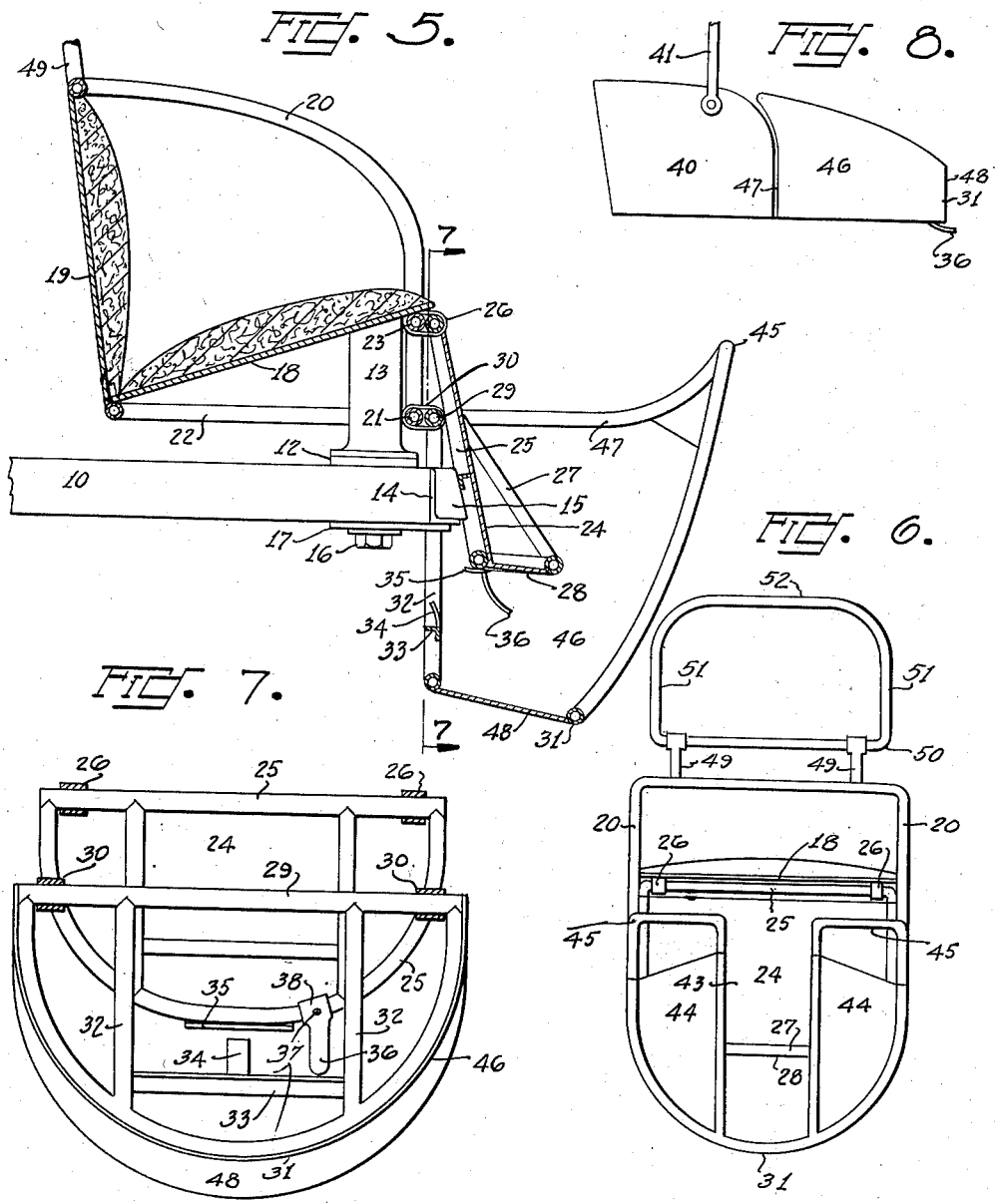

Patented July 11, 1939

2,165,698

UNITED STATES PATENT OFFICE 2,165,698

SEAT FOR AMUSEMENT DEVICES

Lee U. Eyerly, Salem, Oreg.

Application July 23, 1937, Serial No. 155,239

5 Claims. (Cl. 272—36)

This invention relates generally to amusement devices, and particularly to a car therefor.

The main object of this invention is the provision of an improved form of car for holding occupants during the operation of the device illustrated in my United States Patent No. 2,113,131 issued April 5, 1938.

The second object is to construct a car which will simplify getting into and out of the car and at the same time to provide a means for preventing the occupant from being thrown from the car during the travel thereof.

The third object is the construction of a car which will automatically latch when brought to a travelling position and which may be easily unlatched to permit the exit of the passenger.

These and other objects are accomplished in the manner set forth in the following specification as illustrated in the accompanying drawings, in which:

Fig. 1 is a perspective view of the device.

Fig. 2 is a section taken along the line 2—2 in Fig. 1 showing the car in a closed position.

Fig. 3 is a section taken along the line 3—3 in Fig. 1.

Fig. 4 is a perspective view of a hinged strap.

Fig. 5 is a view similar to Fig. 2 showing the car in an open position.

Fig. 6 is a front elevation of the car in the position shown in Fig. 5.

Fig. 7 is a section taken along the line 7—7 in Fig. 5.

Fig. 8 is a side elevation showing a modified form of support for the car.

Similar numerals refer to similar parts throughout the several views.

Referring in detail to the drawings, there is shown an arm 10 which is ordinarily of the merry-go-round radial arm type capable of a vertical swinging motion as described in the above identified patent. On the outer end of the arm 10 is mounted a seat spindle 11 upon which is placed a car bearing plate 12. Upon the plate 12 and rotatably mounted on the spindle 11 is the housing 13. Across the end of the arm 10 is secured an angle bar which constitutes a car jamb support bracket 14 upon which is mounted a resilient bumper 15. On the lower end of the spindle 11 is placed the nut 16 which engages the under side of the plate 17. This is preferably secured to the bracket 14.

To the housing 13 is secured the seat 18 whose back 19 is braced to the seat 18 by means of the side arms 20 which extend downwardly to the transverse tie rod 21 which is in turn joined to the lower end of the back 19 by means of the bars 22. Above the tie rod 21 is placed the tie rod 23. An apron 24 is supported by the frame 25 which is hinged to the tie rod 23 by means of the straps 26. The frame 25 is provided with the side braces 27 which support the foot board 28.

Parallel with the tie rod 21 is the tie 29 which is hinged thereto by means of the straps 30. The tie 29 forms the pivot for the car nose frame whose lower portion 31 is approximately in the form of a semi-circle having its ends secured to the member 29. The spaced longitudinal bars 32 join the members 29 and 31. Between the bars 32 is placed the angle bar 33 into an intermediate portion of which is secured the curved lip 34.

The purpose of the lip 34 is to prevent the hook 35 from engaging the top of the angle bar 33 during a car closing operation.

To the frame 25 and in alinement with the lip 34 is rigidly fixed a hook 35 which is adapted to engage the angle bar 33 when the car nose is raised. A car lock release lever 36 is also rigidly secured to the frame 25 at its end 38 by means of the pin 37 and projects sufficiently past the portion 31 of the car nose frame to make it accessible to the operator.

It can be seen in Fig. 2 that if the lever 36 is raised, the hook 35 will disengage the angle bar 33 and permit the frame 32 to be lowered making it possible for anyone to occupy or vacate the seat 18.

It can be seen from the foregoing that by this construction there is provided an exceedingly simple and efficient form of self-locking car and it is practically impossible to unlock the car from the interior thereof. As an extra precaution there is provided a spring 39 which urges the frame 25 toward the member 31. This holds the hook 35 in engagement with the bar 33 where it remains until it is manually released by the operation of the lever 36.

In Fig. 8 is shown diagrammatically a side elevation of a car 40 adapted for use with Ferris wheels and the like in which the car 40 itself is supported by means of a hanger 41.

In the form of the device shown in Figs. 1 to 7, inclusive, a strap 42 is provided across the opening 43 which is formed between the portions 44 which cover the forward portion of the sides and the nose top whose rearward edges 45 form convenient handles for the passenger. The sides 46 are closed from each corner post 47 to the front end 48. Each corner post 47 connects between the handles 45 and the tie member 29.

There is also provided on the back 19 a pair of uprights 49 to which is hinged a loop 50 whose sides 51 are curved downwardly in a manner that the side 52 extends across the laps of the occupants. The sides 51 are held downwardly by the edges 45. In other words, while the loop 50 is in the position shown in Fig. 2, it will be impossible for the occupant of the car to become unseated.

I claim:

1. A device of the class described consisting of a car, a pivotal support for said car, an apron hingedly attached to the front edge of said car, a nose forming a closure for said car hinged below the apron hinge, and a latch on said apron for holding said nose in an elevated position.

2. A device of the class described consisting of a car, a pivotal support for said car, an apron hinged to the forward edge of said car having a hook at the outermost end thereof, a closure for said car hinged thereto below said apron hinge, said closure having a bar secured thereto adapted to engage said hook when said closure is moved to a passenger retaining position.

3. A device of the class described consisting of a car, a pivotal support for said car, an apron hinged to the forward edge of said car, a foot rest at the outer edge of said car, a hook projecting downwardly from said foot rest, a closure for said car hinged thereto below the apron hinge and a bar on said closure adapted to engage said hook when said closure is raised and a spring between said apron and closure adapted to urge said hook into engagement with said bar.

4. The device described in claim 3, together with a car lock release lever pivotally mounted on said apron and fulcrumed on said bar, the end of said lever projecting beyond the forward end of said closure.

5. In a device of the class described, the combination of a seat having a back and side rail secured thereto, an apron hinged to the forward edge of said seat having an upwardly turned foot rest and a downwardly turned hook at its outermost end, a closure constituting a nose having its lowermost corner hinged to the adjacent lowermost corner of said seat below the apron hinge, said nose having a transverse bar secured thereto adapted to engage said hook when said nose is raised, said nose having an opening formed in the middle of the top side thereof.

LEE U. EYERLY.